Sept. 10, 1968  P. FRENCH  3,401,288
VARIABLE RELUCTANCE DYNAMOELECTRIC MACHINES
Filed July 7, 1967  2 Sheets-Sheet 1
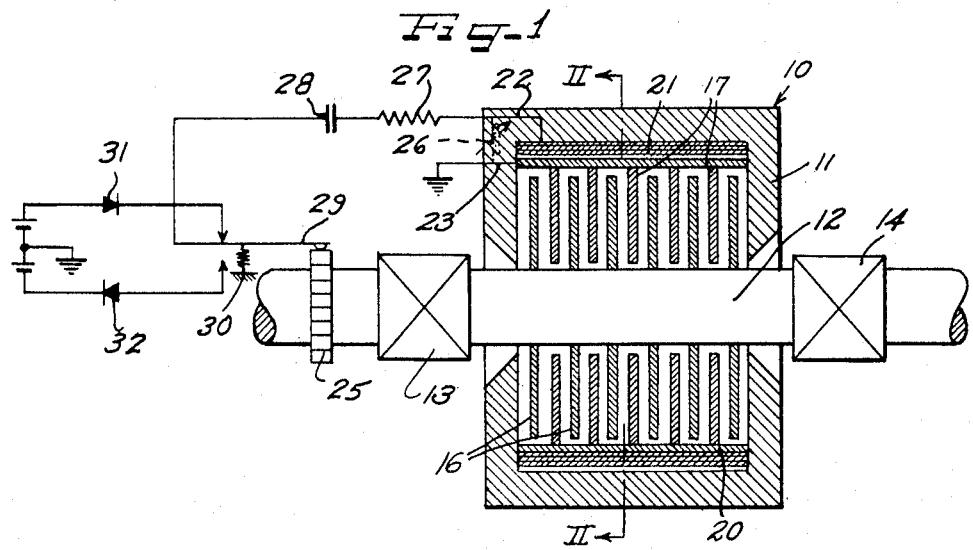
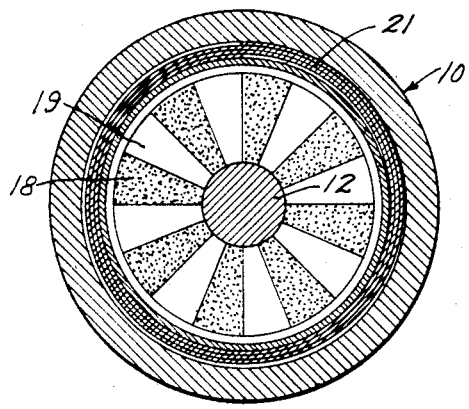
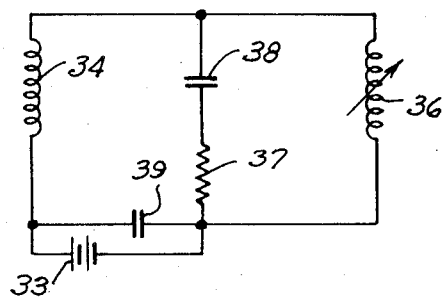
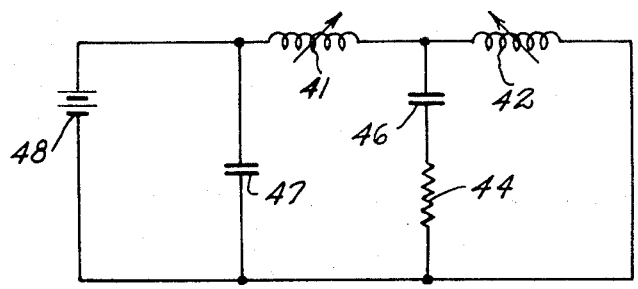
INVENTOR.
Park French
BY  ATTORNEYS

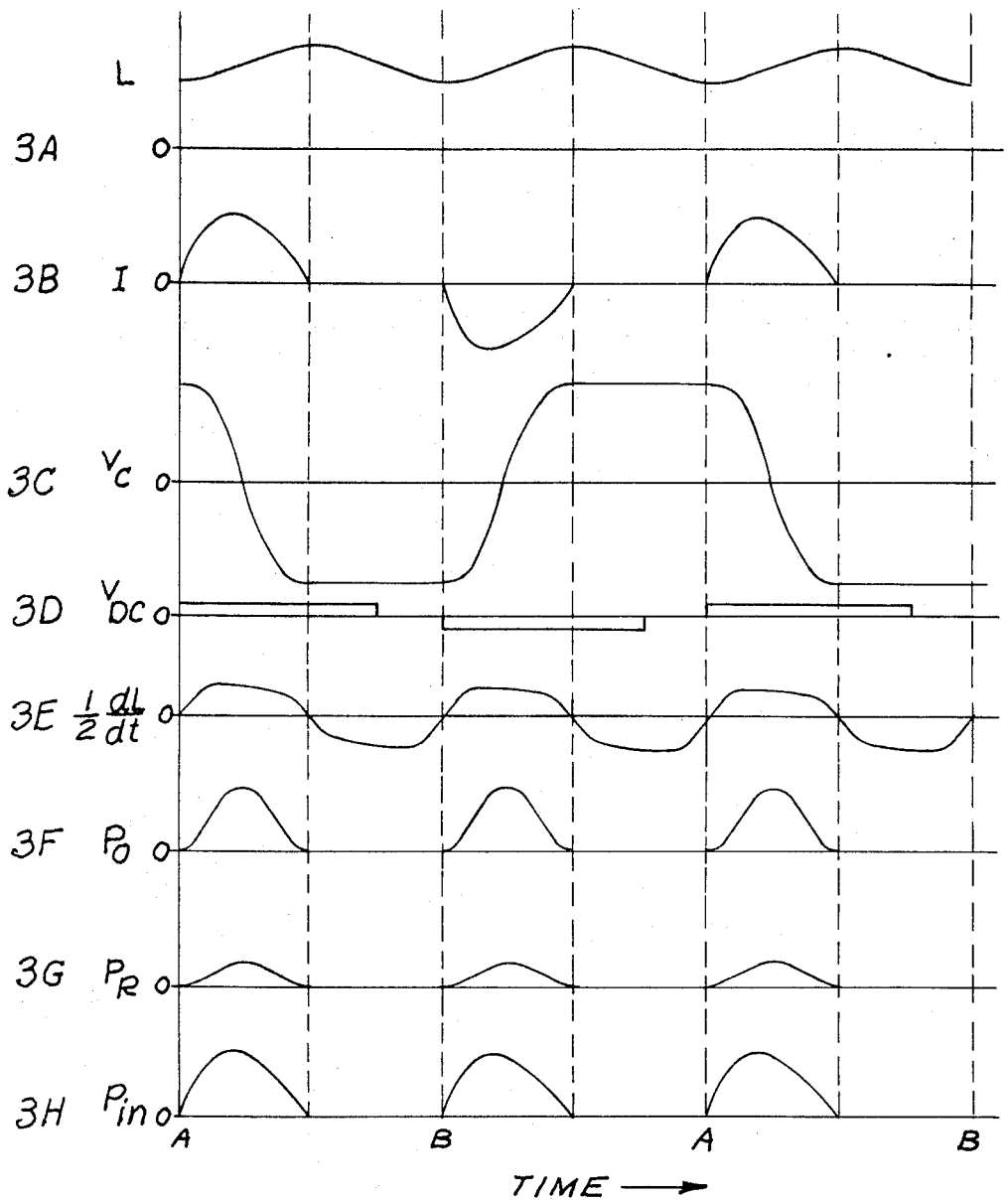

United States Patent Office 3,401,288
Patented Sept. 10, 1968

3,401,288
VARIABLE RELUCTANCE DYNAMOELECTRIC
MACHINES
Park French, Aurora, Ohio, assignor to TRW Inc.,
Cleveland, Ohio, a corporation of Ohio
Continuation-in-part of application Ser. No. 384,733,
July 23, 1964. This application July 7, 1967, Ser.
No. 651,780
7 Claims. (Cl. 310—168)

ABSTRACT OF THE DISCLOSURE

Dynamoelectric machines comprising one or more rotor disks secured to a shaft and a plurality of stator disks secured to the housing, both the rotor disks and the stator disks including a similar spatial arrangement of magnetic and nonmagnetic sectors which cyclically provide relatively high and relatively low reluctance paths axially of the machine as the rotor disks are rotated relative to the stator disks, and energizing means including a coil energized by a periodically varying current, the current reaching its peak value when the axial reluctance is increasing, thereby providing generator action, or when the axial reluctance is decreasing, thereby providing motor action.

CROSS REFERENCE TO RELATED APPLICATION

This application is a continuation-in-part of my application Ser. No. 384,733, filed July 23, 1964, now abandoned.

BACKGROUND OF THE INVENTION

Field of the invention

This invention is in the field of motor or generator structures of the variable reluctance type in which one or more rotor disks are positioned in interleaved relationship with a plurality of stator disks, thereby providing axial air gaps between the disks, the magnetic reluctance axially of the machine being dependent upon the relative rotative position of the rotor disks and the stator disks, with an energizing circuit responsive to the relative position of the rotor disks with respect to the stator disks to energize a surrounding coil with periodically varying current and in timed relation with the rotation of the shaft to provide motor or generator action.

DESCRIPTION OF THE PRIOR ART

There have been some types of variable reluctance dynamoelectric machines previously proposed but these machines have been of limited efficiency and power output.

SUMMARY OF THE INVENTION

In the machines of the present invention there is provided a variable reluctance machine of improved geometry. A rotor shaft carries one or more spaced rotor elements which are in interleaved relationship with a plurality of stator disks. Both the rotor disks and the stator disks have the same geometry consisting of alternating sectors of magnetic and nonmagnetic materials. The individual rotor disks are arranged so that the corresponding magnetic and nonmagnetic sectors are in line along the rotary axis of the machine, and the same is true of the stator disks. A coil is wound around the combination of rotor and stator disks to provide an axial magnetic field of varying intensity depending upon the relative positions between the rotor and stator disk assemblies. In motor operation, the coil is used solely to provide the field, while in generator operation it functions also as the output coil. In either case, numerous magnetic paths link the coil. This feature permits smaller coil losses than in conventional machines of comparable torque output, promoting high efficiencies and allowing efficient operation at speeds much lower than with conventional machines.

The manner and means used to achieve the variable reluctance in the axial magnetic field makes it possible in the practice of the present invention to utilize low permeability magnetic materials in the construction of the machine. It also makes it possible to obtain heretofore unobtainable power to weight ratios at high efficiencies and relatively low shaft speeds.

BRIEF DESCRIPTION OF THE DRAWINGS

FIGURE 1 is a partly schematic electromechanical drawing of a motor embodying the principles of the present invention;

FIGURE 2 is a cross-sectional view taken substantially along the line II—II of FIGURE 1;

FIGURE 3 is a series of current, voltage and power waveforms existing at various portions of the assembly of FIGURE 1;

FIGURE 4 is a circuit diagram illustrating the manner of employing the machine of the present invention as a single phase A.C. generator; and FIGURE 5 is a circuit diagram of an assembly including two single phase generators embodying the principles of the present invention.

DESCRIPTION OF THE PREFERRED EMBODIMENTS

In FIGURE 1, reference numeral 10 indicates generally a dynamoelectric machine produced according to the present invention. The machine includes a frame 11, composed of a ferromagnetic material having a reasonably high permeability, on the order of at least fifty. The frame 11 acts as a low reluctance return path for the magnetic flux. Since the flux through this path varies periodically, the return path material should be composed of a low loss magnetic material such as powdered iron or laminated steel.

A rotor shaft 12 is mounted for rotation within the frame 11 and is supported for such rotation by means of spaced bearings 13 and 14. The shaft 12 carries a plurality of spaced rotor disks 16 which are in interleaved or interdigitated relationship with a plurality of spaced stator disks 17 supported from a nonmagnetic ring 20 secured to the frame 11 and extending inwardly toward the periphery of the shaft 12. Both the rotor disks and the stator disks are identical in magnetic geometry and, as illustrated in FIGURE 2, consist of alternating equal width sectors 18 of ferromagnetic material, and sectors 19 of nonferromagnetic material. The central portions of the disks are to be inactive magnetically so that the shaft 12 is composed of a nonmagnetic material, or the inner ends of the sectors 18 and 19 are secured to a nonmagnetic ring which is secured to the shaft 12. The magnetic sectors 18 are composed of compressed powdered iron, laminated steel or other low loss magnetic material, and the sectors 19 are composed of a suitable nonmagnetic material, preferably nonconductive, such as a molded plastic or ceramic material. The thicknesses of the disks 16 and 17 are comparable to or smaller than the mean sector width.

The magnetic sectors in the rotor set are all axially aligned with each other, as are the corresponding magnetic and nonmagnetic sectors in the stator set. When the rotor is turned, its magnetic sectors 18 alternately align themselves with the magnetic and nonmagnetic sectors of the stator. The variation in reluctance to an axial magnetic field can be made very large by this action.

The coil which provides the necessary axial magnetic field may take the form of convolutions of an electrically conductive strip 21, the individual turns of the coil being electrically insulated from each other. Thus, when a current passes through the coil 21, an axial magnetic field is provided, the field encountering a variable reluctance, depending upon the relative position between the rotor disks 16 and the stator disks 17. The flux return path of the machine extends through the ends of the frame member 11 and through its base.

High values of power per unit volume can be obtained when the closed to open magnetic circuit reluctance ratio is on the order of about 2 to 1. In obtaining these reluctance ratios with the machines of the present invention, relatively low permeability materials can be used on the order of 10 to 20, for example, in combination with very small axial gaps. This is entirely feasible from a mechanical tolerance standpoint and allows the use of easily formed materials such as pressed powdered iron in the magnetic circuit of the stator and rotor disks. Alternatively, substantially the same performance can be obtained with high permeability sectors in combination with larger axial gaps. An example of high permeability material is laminated electrical steel. Typical gaps with such material are in the order of one-tenth the disk thicknesses. When employing laminated materials, the laminae should be oriented normal to the radial direction to minimize eddy current losses.

The shaft power developed or absorbed by the machines of the present invention varies directly with both the stored magnetic energy variation and with the frequency of the reluctance variation. Thus, for high power operation it is desirable to vary the reluctance at high frequencies. It is clear that this can be accomplished at even relatively low shaft speeds by incorporating a large number of sectors in each disk.

A suitable timing circuit for introducing pulsed current into the coil 21 is illustrated in FIGURE 1, although it will be recognized that there are many other means for providing such current pulses. In the circuit shown, a pair of conductors 22 and 23 are connected to the electrical ends of the coil 21. The inductance of the coil 21 has been represented by the dashed line coil 26. The reference numeral 27 has been applied to a resistor which represents the effective resistance of the motor. An external capacitor 28 is provided in series with the inductance and the resistance 27, and is connected to a switch arm 29. The switch arm 29 engages a lobed cam 25 which is secured to the shaft 12. The lobes on the cam 25 are correlated with the geometry of the rotor disks 16 and the stator disks 17 such that the switch arm 29 is in its upper position when the axial reluctance is at a minimum, and moves to its lower position, as illustrated in FIGURE 1, the next time the axial reluctance again reaches its minimum. A spring 30 biases the spring arm 29 into contact with the lower contact, i.e., the spring arm 29 is in its down position.

A pair of diodes 31 and 32 are connected in opposite directions across the switch 29 and appear across a source of DC potential represented by a battery B.

The various current, voltage and power waveforms for the operation of the motor of FIGURE 1 are illustrated in FIGURE 3. FIGURE 3A shows the time variation of inductance for a motor operating at constant speed, with the maximum and minimum values being marked by dashed lines. FIGURE 3B shows the current pulses provided to the coil 21 by the timing circuit of FIGURE 1, and initiated by operation of the switch 29. The symbol A indicates that switch 29 is in the up position where it is connected to the positive voltage supply, and the symbol B indicates switch 29 is in the lower position where it is connected to the negative side of the voltage supply.

The stored energy is relatively large compared to the shaft energy produced per cycle. This results in a high Q circuit in which the peak capacitor voltage is substantially larger than the D.C. supply voltage. Thus, the principal driving voltage applied to the motor coil 21 is the voltage across capacitor 28. This voltage appears in FIGURE 3C. FIGURE 3D shows the D.C. voltages applied by the switch 29.

Steady state motor operation takes place as follows. At the time instant identified as A the capacitor 28 has previously been charged in the positive direction. Switch 29 closes to the positive side, connecting the circuit in series with the positive voltage supply. Under these circumstances, the capacitor voltage and the supply voltage are additive, initiating a rapidly rising current pulse through the motor coil. As time progresses, charge is drained from the capacitor 28, reducing its voltage. This reduction in voltage results in a continual decrease in the slope of the current waveform, and the current reaches a peak when the sum of the capacitor voltage and the supply voltage is approximately zero. At this time, a large amount of inductive energy is stored in the motor. As in a typical R-L-C circuit, the motor inductance then causes the current to continue to flow at a progressively decreasing rate until the inductive energy has been transferred to the capacitor again by charging it in the opposite direction. In general, the circuit behavior just described corresponds closely to one-half cycle of a freely oscillating R-L-C circuit of comparable Q. The only notable difference from this familiar case can be seen in FIGURE 3B, where the current rise is seen to be more rapid than the current fall, in contrast with the symmetric half-sine wave of a simple R-L-C circuit. The asymmetry in FIG. 3B results from the time variation of the motor inductance. The voltage developed across the capacitor 28 is in opposition to the supply voltage and is of sufficient magnitude to cause a current reversal through the motor coil. This reversal is prevented, however, by diode 31 so the capacitor remains charged at full voltage until switch 29 is connected to the negative side on the the following cycle. At that time, the capacitor voltage adds to the negative supply voltage and provides a negative current pulse through the motor coil that is equivalent to the previously described positive pulse except for sign.

Thus, it will be seen that each cycle begins with reactive energy stored in a capacitor. This energy is transferred to the motor inductance during the cycle, and the cycle ends with the reactive energy again being stored in the capacitor.

Considering the power relationships, the voltage V, across the motor coil 26, neglecting resistive losses, can be described in terms of the instantaneous current I, and the instantaneous inductance L as:

$$V = \frac{d}{dt}(IL) \quad (1)$$

which may be written:

$$V = L\left(\frac{dI}{dt}\right) + I\left(\frac{dL}{dt}\right) \quad (2)$$

The instantaneous power supplied to the coil is:

$$P = IV \quad (3)$$

which from Equation 2 becomes:

$$P = LI\left(\frac{dI}{dt}\right) + I^2\left(\frac{dL}{dt}\right) \quad (4)$$

The net energy supplied to the coil during a pulse (commonly referred to as the real energy component) can be found by integrating Equation 4 over the period of a pulse referred to as "a":

$$W_{real} = \int_t^{t+a} \left(LI\frac{dI}{dt}\right)dt + \int_t^{t+a} I^2\left(\frac{dL}{dt}\right)dt \quad (5)$$

where $t$ is the time of switch closure. The left hand integral may be integrated by parts, so Equation 5 becomes:

$$W_{real}=\left(\frac{LI^2}{2}\right)_{t+a}-\left(\frac{LI^2}{2}\right)_t$$
$$-\int_t^{t+a}\frac{I^2}{2}\left(\frac{dL}{dt}\right)dt+\int_t^{t+a}I^2\left(\frac{dL}{dt}\right)dt \quad (6)$$

Since I has a value of zero at times $t$ and $t+a$, the first two terms of Equation 6 vanish. The two remaining integrals are of the same form and may be combined, yielding the real energy supplied to the coil per pulse as:

$$W_{real}=\int_t^{t+a}\frac{I^2}{2}\left(\frac{dL}{dt}\right)dt \quad (7)$$

The form of this equation is identical with that of the energy supplied by the same current pulse to a resistor having the instantaneous value $$\frac{1}{2}\frac{dL}{dt}$$

Thus, the real energy supplied to the coil per pulse, and appearing as mechanical shaft energy, can be computed as though the motor constituted a time varying resistor of the above form.

The quantity $$\frac{1}{2}\frac{dL}{dt}$$

appears as FIGURE 3E. Below it, as FIGURE 3F, there appears the product of this quantity and the square of the current pulse. This product is the instananeous mechanical power delivered to the shaft, and is the real power delivered to the coil, neglecting electrically losses. The time average of this product corresponds to the average power delivered to the motor shaft by the magnetic structure. Subtracting frictional losses from this average yields the shaft output power.

The foregoing analysis neglects electrical losses in the coil, in the magnetic materials, and in the remainder of the circuit. Although there are some nonlinearities, these losses can be combined without significant error as a linear resistor 27 shown in FIGURE 1. The instantaneous electrical power loss is the product of this resistance value and the square of the pulse current and is shown in FIGURE 3G. FIGURE 3H shows the instantaneous input power which is the product of the pulse current and the supply voltage. Since the input voltage is constant during each pulse, the input power waveform is the same as the current pulse waveform.

The circuit of FIGURE 4 can be used when operating the machine as an alternating current generator. In this circuit, a D.C. source 33 provides a D.C. bias through a shunt inductance 34 in parallel with the motor inductance 36. The load resistance 37 is connected in series with a capacitor 38, and the value of the capacitor is chosen to resonate with the parallel combination of the inductance 34 and the average machine inductance 36. A relatively large capacitor 39 is provided across the D.C. source 33. Another generator was made consisting essentially of two single phase generators on the same shaft, and operated with the circuit shown in FIGURE 5. The two generator sections were removed 180 electrical degrees from each other. In FIGURE 5, the inductances of the two sections, represented at reference numerals 41 and 42, and a D.C. source at reference numeral 48. The load resistance is represented by a resistance 44, the resonating capacitor at reference numeral 46, and the shunt capacitor by reference numeral 47. The advantages of two-section operation are the elimination of the shunt inductance, together with its electrical losses, and complete symmetry of the alternating current waveform produced.

The maximum torque available from the machine described is essentially independent of speed at any given output or input current, provided that electrical frequencies are kept in the region of low magnetic material power loss. With a material such as as a pressed iron powder as the ferromagnetic material, the low loss region extends from direct current to approximately 20 kilocycles.

The operation of the generator circuits shown in FIGURES 4 and 5 can be best seen from the following simplified example. Consider the inductor 34 in FIGURE 4 to be so large in value compared to 36 that negligible A.C. currents flow in 34. This simplifiying consideration effectively restricts the A.C. currents to the loop formed by elements 36, 37, and 38, which form a parallel resonant circuit. Let us further assume that the fractional change in the generator inductance 36 over an operating cycle is small and is sinusoidal in nature. This assumption allows the analysis of the circut by sinusoidal waveforms, which permits much simpler analysis than the more complex waveforms associated with large fractional inductance changes. The behavior of this simplified circuit is easily understood and is qualitatively similar to the behavior of real circuits having large fractional inductance changes and realistic values for inductor 34.

During steady state operation, the current through the generator inductance 36 is the sum of the D.C. battery current $I_0$ and an A.C. current I, which has the angular frequency $\omega$. This angular frequency is made equal to both the operating frequency of the generator and to the resonant frequency of the A.C. circuit composed of elements 36, 37 and 38. The current through coil 36 can be represented as, $$I=I_0+I_1 \sin \omega t \quad (8)$$

The inductance of coil 36 can be represented by $$L=L_0+L_1 \cos \omega t \quad (9)$$

where $L_1$ is small compared to $L_0$.

The instantaneous voltage developed across coil 36 is, from Equation 1, $$V=\frac{d}{dt}(LI) \quad (10)$$

The instantaneous power supplied to the coil is the product of this voltage and the current through the coil, which yields the same form as Equation 4.

$$P=LI\left(\frac{dI}{dt}\right)+I^2\left(\frac{dL}{dt}\right) \quad (11)$$

Since the waveforms are sinusoids, the real component of the generator power is the average value of Equation 11, $$P_{real}=LI\overline{\left(\frac{dI}{dt}\right)}+I^2\overline{\left(\frac{dL}{dt}\right)} \quad (12)$$

where the bars indicate time averages.

From Equation 8, $$\frac{dI}{dt}=\omega I_1 \cos \omega t \quad (13)$$

and from Equation 9, $$\frac{dL}{dt}=-\omega L_1 \sin \omega t \quad (14)$$

In evaluating Equation 12, all antisymmetric functions disappear, having zero average values. The real power thus reduces to, $$P_{real}=\omega L_1 I_0 I_1 \overline{\cos^2 \omega t}-2\omega L_1 I_0 I_1 \overline{\sin^2 \omega t} \quad (15)$$

which has the value, $$P_{real}=-\frac{1}{2} \omega L_1 I_0 I_1 \quad (16)$$

Since the form of $P_{real}$ was set up as the power delivered to the coil, the negative sign indicates that power is delivered by the coil. This power is dissipated in resistor 37 which represents the sum of the load resistance and the internal loss resistance of the generator.

The alternating current component $I_1 \sin \omega t$ of Equation 8 flows both through the motor coil 36 and through the resistance 37. Denoting the resistance 37 as R, the average power delivered to R is:

$$P_R = \tfrac{1}{2} I_1^2 R \tag{17}$$

This value must equal the real power delivered by the coil given in Equation 16, which makes it possible to find the value of R which corresponds to the A.C. current amplitude $I_1$. Equating the absolute values of Equations 16 and 17 yields:

$$\tfrac{1}{2}\omega L_1 I_0 I_1 = \tfrac{1}{2} I_1^2 R \tag{18}$$

Solving for R yields:

$$R = \frac{\omega L_1 I_0}{I_1} \tag{19}$$

Since the resistor 37 includes both the load resistance and an effective internal resistance which is appropriately sized to account for internal generator losses, exclusive of D.C. excitation losses, R can be written as the sum of a load resistance $R_L$ and an effective internal resistance $R_i$.

$$R = R_L + R_i \tag{20}$$

The power dissipated in the load from Equation 17 becomes:

$$P_L = \tfrac{1}{2} I_1^2 R_L \tag{21}$$

The conversion of mechanical to electrical power takes place with an efficiency having the value:

$$\eta = \frac{P_L}{P_R} \tag{22}$$

which, from Equations 17, 20 and 21, becomes:

$$\eta = \frac{R_L}{R_L + R_i} \tag{23}$$

In ordinary generator operation, the A.C. current amplitude I is equal to or less than the D.C. biasing current $I_0$. It can be stated generally that when I is comparable to $I_0$, powers per unit weight are highest and power factors are lowest. As I is decreased relative to $I_0$, powers per unit weight decrease and power factors increase. The superposed A.C. and D.C. currents in generator operation result in total current levels which vary periodically between high and low values. The circuit described above provides highest currents during the opening of the magnetic circuit (decreasing inductance), resulting in a net absorption of shaft power.

The two-section generator circuit of FIGURE 5 operates in a manner identical to the above, except that two generator sections are operated in parallel from an A.C. standpoint and in series from a D.C. standpoint. This manner of operation removes them 180 electrical degrees from each other and obviates the necessity of an inductance to block A.C. currents from the biasing source (element 34 in FIGURE 4). This type of operation results in an economy of size and weight and produces higher efficiency than the circuit of FIGURE 4 since the losses of coil 34 are eliminated. The circuit of FIGURE 5 also produces completely symmetric waveforms in high output designs in which large fractional changes in inductance occur. This feature is of advantage in many A.C. applications.

The machines described herein fulfill all the requirements previously noted. By controlling the relative spacing between disks and the permeability of the magnetic material used, the inductive energy changes over the operating cycle can be controlled to desired values, for highest efficiency or highest power. Since the disk structure is relatively simple, large numbers of sectors per disk can be utilized, raising the operating frequency to a large multiple of the shaft frequency. The limit in sector numbers is determined only by mechanical axial gap versus disk diameter tolerances and by frequency limits set by the ferromagnetic material properties.

It should be evident that various modifications can be made to the described embodiments without departing from the scope of the present invention.

I claim as my invention:

1. A dynamoelectric machine comprising a frame, a shaft supported for rotation within said frame, at least one rotor element secured to said shaft, a plurality of stator elements extending from said frame in interleaved relation with the rotor elements, said rotor elements and said stator elements each consisting of disks having alternating areas composed of magnetic and nonmagnetic materials, the alternating magnetic and nonmagnetic areas in said stator elements being axially aligned with each other, and the alternating magnetic and nonmagnetic areas in said rotor elements being axially aligned with each other, whereby rotation of said rotor elements relative to said stator elements produces a variable reluctance to an axially extending magnetic field, a coil extending axially about the combination of rotor and stator elements, and means for supplying said coil with a periodically varying current, said current reaching its peak value in each cycle when the axial reluctance is other than at its minimum value.

2. The machine of claim 1 in which said periodically varying current reaches its peak value at intervals of decreasing axial reluctance between said rotor and stator elements.

3. The machine of claim 1 in which said periodically varying current reaches its peak value at intervals of increasing axial reluctance between said rotor and stator elements.

4. The machine of claim 1 in which the variation in reluctance axially of the machine upon rotation of said rotor elements is on the order of 2 to 1.

5. The machine of claim 1 in which the permeability of said magnetic material is on the order of 10 to 20.

6. The machine of claim 1 in which the frame has a magnetic permeability of at least 50.

7. A dynamoelectric machine comprising a frame, a shaft supported for rotation within said frame, a plurality of rotor elements carried by said shaft in closely spaced relation, a plurality of stator elements extending from said frame in interleaved relation with said rotor elements, the configuration of said rotor and stator elements being substantially identical and consisting of disks having alternating sectors of magnetic and non-magnetic properties, the alternating magnetic and nonmagnetic sectors of said stator elements being axially aligned with ing alternating sectors of magnetic and nonmagnetic sectors of said rotor elements being axially aligned with each other, whereby rotation of said rotor elements relative to said stator elements significantly varies the magnetic reluctance axially of said machine, a coil wound about the combination of rotor and stator elements and providing an axial magnetic field when energized with an electric current, said frame providing a flux return path for said machine, and means for applying a periodically varying current to said coil, said current reaching its peak value in each cycle of reluctance variation when the axial reluctance is other than at its minimum value.

References Cited

UNITED STATES PATENTS

| | | | |
|---|---|---|---|
| 579,012 | 3/1897 | Scheeffer | 310—168 |
| 2,438,629 | 3/1948 | Anderson | 310—268 |
| 3,247,407 | 4/1966 | Bruneel | 310—168 |
| 3,284,651 | 11/1966 | Wesolowski | 310—168 |

MILTON O. HIRSHFIELD, *Primary Examiner.*

L. L. SMITH, *Assistant Examiner.*